United States Patent [19]

Watanabe

[11] Patent Number: 4,644,370

[45] Date of Patent: Feb. 17, 1987

[54] IMAGE-FORMING APPARATUS

[75] Inventor: Junji Watanabe, Yokohama, Japan

[73] Assignee: Kabushiki Kaisha Toshiba, Kawasaki, Japan

[21] Appl. No.: 693,049

[22] Filed: Jan. 22, 1985

[30] Foreign Application Priority Data

Jan. 25, 1984 [JP] Japan .................................. 59-11169

[51] Int. Cl.[4] .............................................. G01D 15/10

[52] U.S. Cl. ................................ 346/76 PH; 346/105; 400/120; 400/702

[58] Field of Search ................ 346/76 PH, 76 R, 105, 346/106; 400/701, 120, 702, 702.1; 101/425, 423, 424

[56] References Cited

U.S. PATENT DOCUMENTS 3,477,083 11/1969 Park .................................... 400/702
3,872,961 6/1985 St. James ............................ 400/702

FOREIGN PATENT DOCUMENTS 2756334 6/1979 Fed. Rep. of Germany .
3146242 5/1983 Fed. Rep. of Germany ...... 400/702
0057771 4/1984 Japan .................................. 400/701
2100673 1/1983 United Kingdom ........... 346/76 PH

OTHER PUBLICATIONS

M. Suzuki, Patent Abstracts, "Thermal Printer".
S. Takenaka, Patent Abstracts, "Transcription Material".
IBM Tech. Disc Bulletin, vol. 26, No. 313, Aug. 1983, by Bowlds et al, pp. 1586–1587, "Automatic Printhead Cleaner".

*Primary Examiner*—Arthur G. Evans
*Attorney, Agent, or Firm*—Schwartz, Jeffery, Schwaab, Mack, Blumenthal & Evans

[57] ABSTRACT

An image-forming apparatus in which a recording head transfers a color agent from a transfer material in accordance with a latent image so as to form an image on a sheet, and which has a cleaning device for cleaning the recording head. The cleaning device includes a cassette case which is detachable at a position opposing the recording head, and a cleaning member which is stored in the cassete case and, at a time of cleaning the recording head, is opposed thereto to clean the head to clean it.

12 Claims, 22 Drawing Figures

IMAGE-FORMING APPARATUS

BACKGROUND OF THE INVENTION

The present invention relates to an image-forming apparatus which forms an image in such a manner that the recording head transfers a color agent from a transfer member onto a sheet.

Among conventional transfer apparatuses of this type is a thermal transfer printer which prints an image by heating a ribbon impregnated with a color agent. It is small, low-priced, noise-free, and can print an image on ordinary paper. Therefore, it has recently been used in computers, recorders, word processors, and copying apparatuses.

In the thermal transfer printer of this type, to form an image, a ribbon (or transfer material) containing a color agent is brought into contact with a recording head, and the color agent is melted by heat and transferred to a sheet. In this process, the color agent or foreign material such as dust can undesirably attach to the recording head.

Conventionally, to clean the recording head, the ribbon must be removed so as to expose the recording head. However, it is difficult to remove the ribbon, and the space around the recording head is too small to allow manual cleaning. For this reason, manual cleaning of the head is difficult and time-consuming.

SUMMARY OF THE INVENTION

Accordingly, the object of the present invention is to provide an image-forming apparatus having a cleaning device whose recording head can be easily and quickly cleaned.

According to the present invention, there is provided an image-forming apparatus in which a recording head transfers a color agent from a transfer member to a sheet to develop a latent image, a cleaning device is provided to clean the recording head, a cassette containing the transfer member can be removed at a position where it opposes the head, and a cleaning member, which is provided in the cassette, is brought to oppose the head so as to clean the head.

DETAILED DESCRIPTION OF THE PREFERRED EMBODIMENTS

Preferred embodiments of the present invention will now be described in detail with reference to the accompanying drawings of FIGS. 1 to 22. Referring first to FIGS. 1 to 20, one embodiment of the invention will be described in detail.

Figure 1:
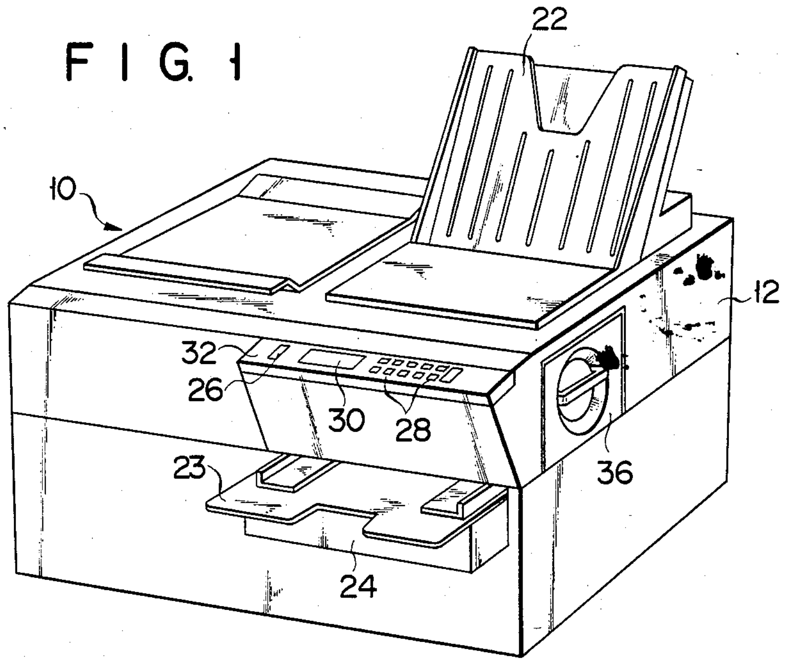
FIG. 1 is a perspective view of a heat transfer apparatus used for one embodiment of the present invention.
Figure 2:
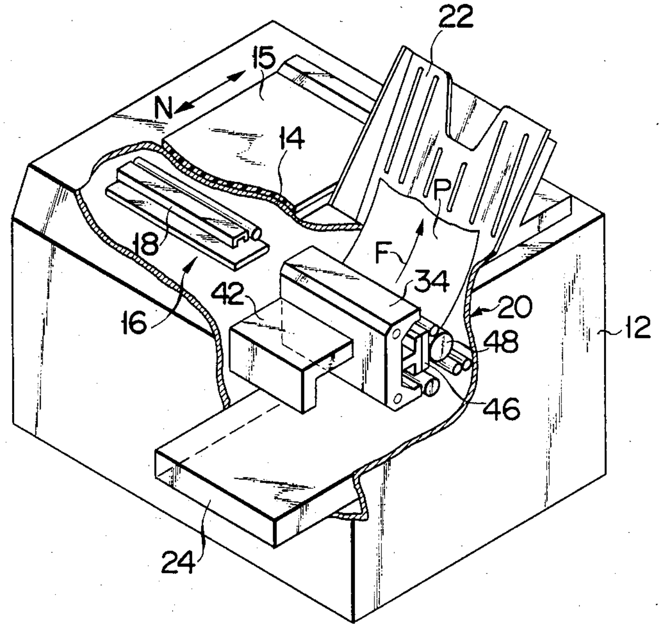
FIG. 2 is a broken away, perspective view schematically showing the transfer apparatus of FIG. 1.

In FIG. 1 a thermal transfer copying apparatus is indicated generally by the number (transfer apparatus) 10. As shown in FIGS. 1 and 2, a housing 12 has an original table 14, on which an original may be placed. The original table 14 is formed of a transparent material such as glass. Under the original table 14 lies a scanning unit 16 for scanning the original paper on the original table 14. The scanning unit 16 is provided with an optical exposure system 18 which can move in the direction of arrow N to expose the original. The scanning unit 16 also has a function to convert optical information obtained through the exposure system 18 into an electric signal. Disposed in the central portion of the housing 12 is an image forming unit 20 for forming an image on a sheet in accordance with the electric signal from the scanning unit 16.

A tray 22 is secured to the top of the housing 12 for receiving the copied sheet from the image forming unit 20. A sheet cassette 24 for supplying the image forming unit 20 with sheets is removably attached to the front of the housing 12. Provided at the upper front portion of the housing 12 is an operator control panel 32 with a start button 26, a keyboard including ten keys 28 bearing numerals 0 to 9, a display 30 for indicating operator guidance, such as "clogging", and a button 31 for ejecting the ribbon cassette.

A door 36 is attached to the flank of the housing 12 which can be opened and closed when setting a ribbon cassette 34 (mentioned later) as a transfer member in the housing 12. The door 36 is provided with a lock mechanism 40 (see FIGS. 16 and 17) which can be locked by operating the numeral keys 28.

The image forming unit 20 comprises a holder 42 which regulates the position of the ribbon cassette 34 and holds it in place when the ribbon cassette 34 is set in the housing 12, and a thermal head 46 for heating that portion of the ribbon 44 which is exposed from the ribbon cassette 34 for ink transfer. The heating elements of the thermal head 46 are selectively energized in accordance with the electric signals from the exposure system 18, and melt a color agent applied to the ribbon 44 and transfer it to the sheet. A platen 48 for pressing the ribbon 44 and the sheet P against the thermal head 46 faces the thermal head 46 with the ribbon 44 between them. A radiating board 50 for radiating heat generated from the thermal head 46 is disposed at the back (on the sheet cassette side) of the thermal heat 46.

Figure 3:
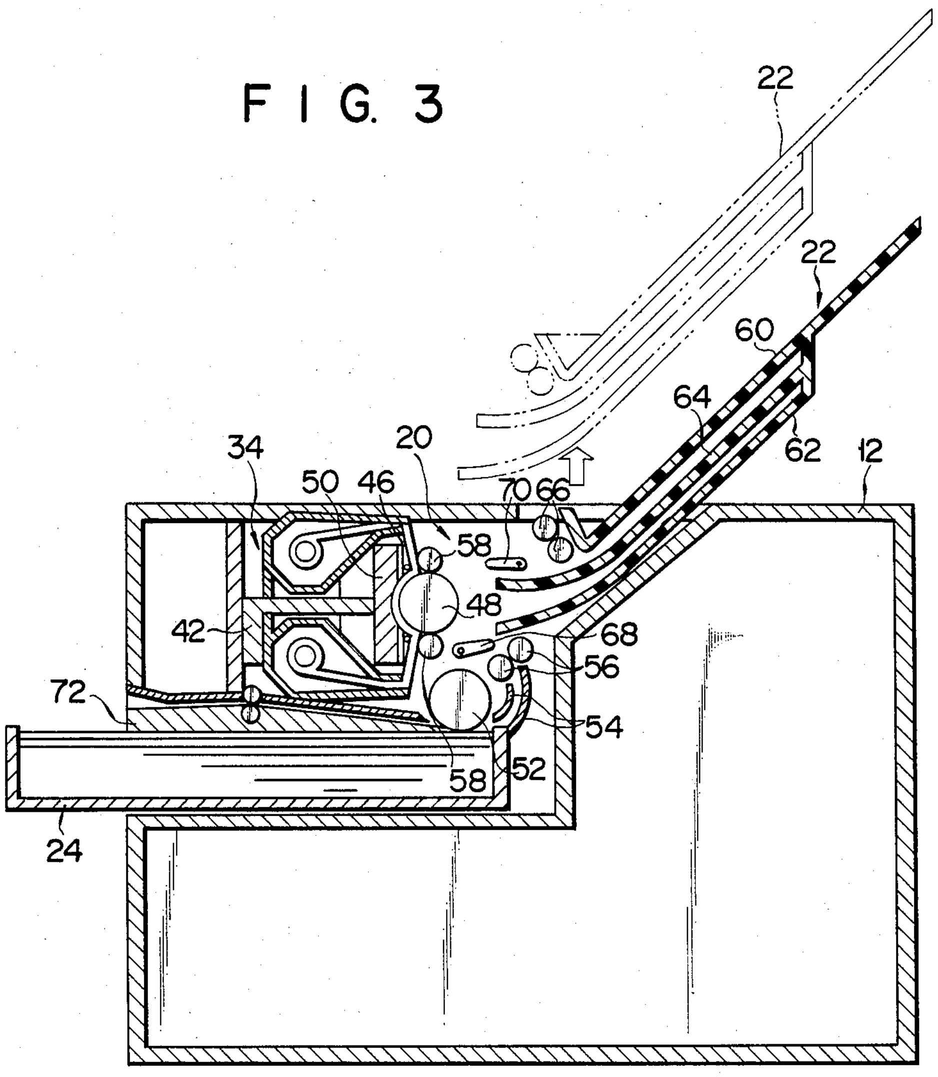
FIG. 3 is a vertical sectional view schematically showing the transfer apparatus of FIG. 1.

Referring now to FIG. 3, the image forming unit 20 will be described in detail. A takeout roller 52 is provided in front of the sheet cassette 24 to take sheets P from the cassette 24 one by one. Arranged close to the roller 52 are a pair of guide plates 54 for guiding each sheet P taken out by the takeout roller 52. Also arranged near the roller 52 are a pair of aligning rollers 56 for aligning the front edge of the guided sheet P. Two backup rollers 58 are arranged above and below the platen 48 to press the sheet P fed from the rollers 56 against the platen 48.

The tray 22, which adjoins the image forming unit 20, is integrally formed of a bearing plate 60 to receive the copied sheets. First and second guide plates 62 and 64 are provided to guide the sheets during the image forming process, such that the sheets are temporarily held on them. A pair of exit rollers 66 for discharging the sheets from the image forming unit 20 onto the bearing plate 60 are arranged at the inner end portion of the bearing plate 60. The tray 22 and the exit rollers 66 form one unit and are removably attached to the housing 12.

A first distribution guide 68 for changing the course of the sheets during the image forming process is swingably set between the aligning rollers 56 and the platen 48. The first distribution guide 68 selectively guides those sheets from the aligning rollers 56 toward the platen 48 and the sheets from the platen 48 to the first guide plate 62. Likewise, a second distribution guide 70 is swingably set between the exit rollers 66 and the platen 48 to guide the sheets to the bearing plate 60 and to the second guide plate 64. As shown in FIG. 3, numeral 72 designates a sheet-bypass guide 72. Through this bypass an operator may manually feeds sheets one by one into the apparatus.

Figure 4:
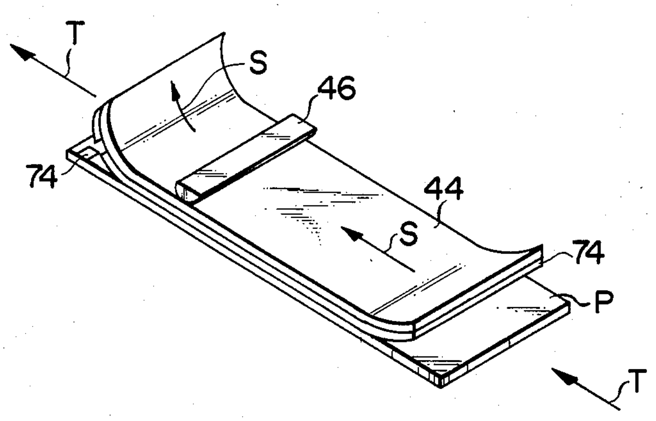
FIG. 4 is a perspective view for illustrating the transferring operation of the transfer apparatus of FIG. 1.

In the thermal transfer printing using the thermal head 46, as shown in FIG. 4, ink (color agent) 74 applied to the ribbon 44 is heated and melted by the thermal head 46, and is transferred to a sheet P. During the thermal transfer, the ribbon 44 and the sheet P simultaneously move in the directions of arrows S and T, respectively.

Figure 5:
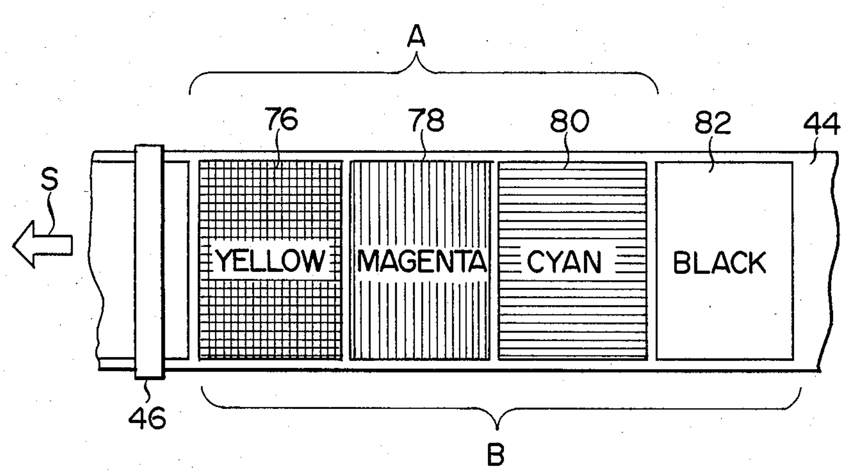
FIG. 5 is a plan view showing the way ink is applied to a ribbon used in the transfer apparatus of FIG. 1.

As shown in FIG. 5, the ribbon 44 has a continuous range A covering, for example, a yellow-ink region 76, a magenta-ink region 78, and a cyan-ink region 80. It may have a range B covering all these regions 76, 78 and 80 plus a black-ink region 82. In the transfer, one of those ink colors is first transferred to the sheet P. The sheet P is returned to its original position to be subjected to ink transfer for another color. Thus, by repeating this transfer process, some ink colors are superposed to provide a color print. In general, a black color can be obtained by superposing the three colors in the range A. A deeper black color may be obtained by using a ribbon having the range B which covers the four color-ink regions including the black-ink region 82.

Referring now to FIGS. 6 to 9, the operation of the image forming unit 20 will be described.

Figure 6:
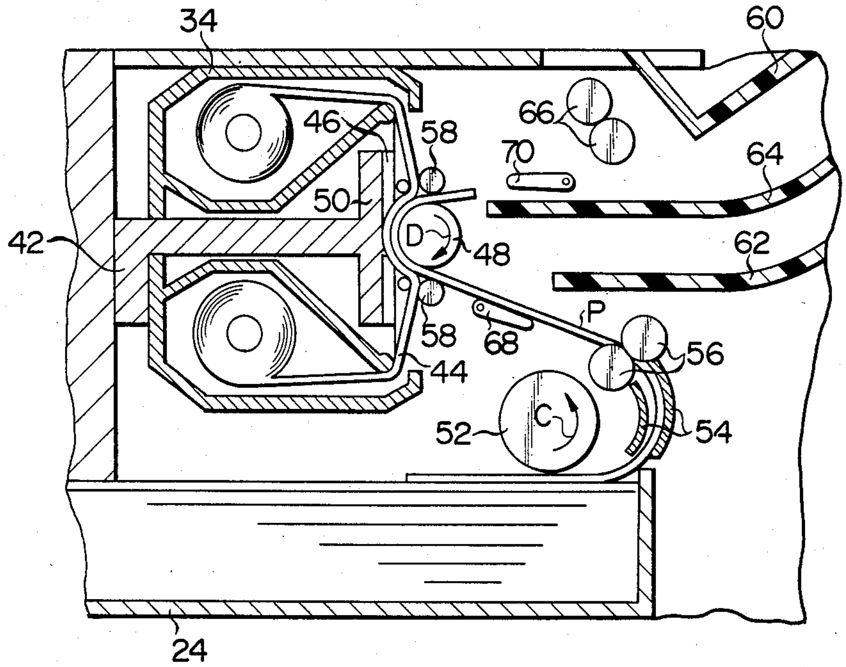
FIGS. 6 to 9 are sectional views for illustrating the operation of the transfer apparatus of FIG. 1.

When the takeout roller 52 rotates in the direction of arrow C, as shown in FIG. 6, a sheet P is taken out from the sheet cassette 24. Then, the sheet P is guided to the aligning rollers 56 by the guide plate 54. The front edge of the sheet P is aligned by the aligning rollers 56. The sheet P is further conveyed to reach the platen 48. Since the platen 48 is rotated in the direction of arrow D, the sheet P moves along the platen 48 to face the thermal head 46 across the ribbon 44. As mentioned before, the thermal head 46 heats the ribbon 44 in accordance with the signals from the exposure system 18, thereby printing the first-color ink of the ribbon 44 on the sheet P.

Figure 7:
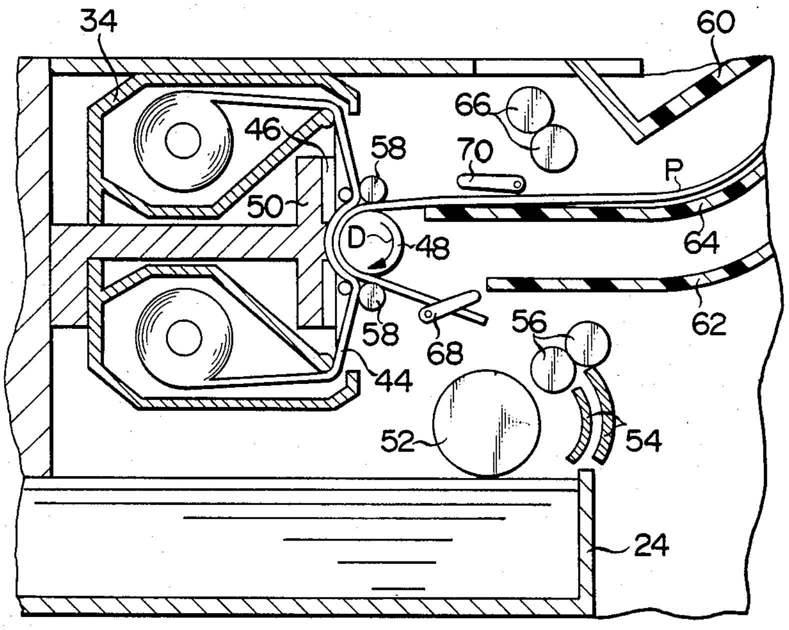

As shown in FIG. 7, the second distribution guide 70 is located substantially parallel to the second guide plate 64, and guides the sheet P having undergone the first printing cycle for the first color so that it is temporarily located on the second guide plate 64. The first distribution guide 68 is lifted up when the sheet P is about to finish passing by the guide 68.

Figure 8:
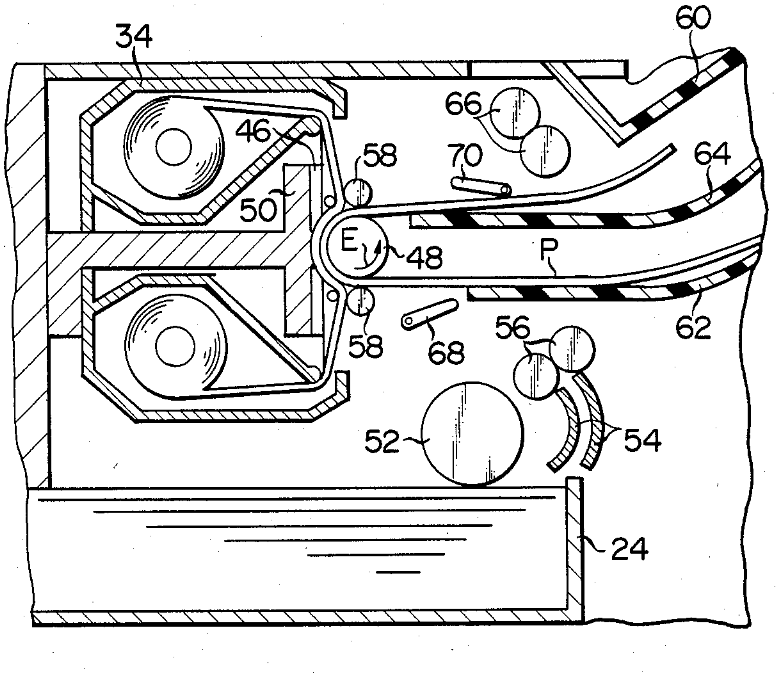

The sheet P having undergone the first printing cycle for the first color is moved from the upper surface of the second guide plate 64 to the upper surface of the first guide plate 62, as shown in FIG. 8. Namely, the sheet P is temporarily returned to the first guide plate 62 for the second printing cycle for the second color. The platen 48 is rotated counterclockwise or in the direction of arrow E, so that the sheet P is moved along the first guide plate 62. Since the first distribution guide 68 is lifted upward, the sheet P smoothly moves along the upper surface of the first guide plate 62.

Figure 9:
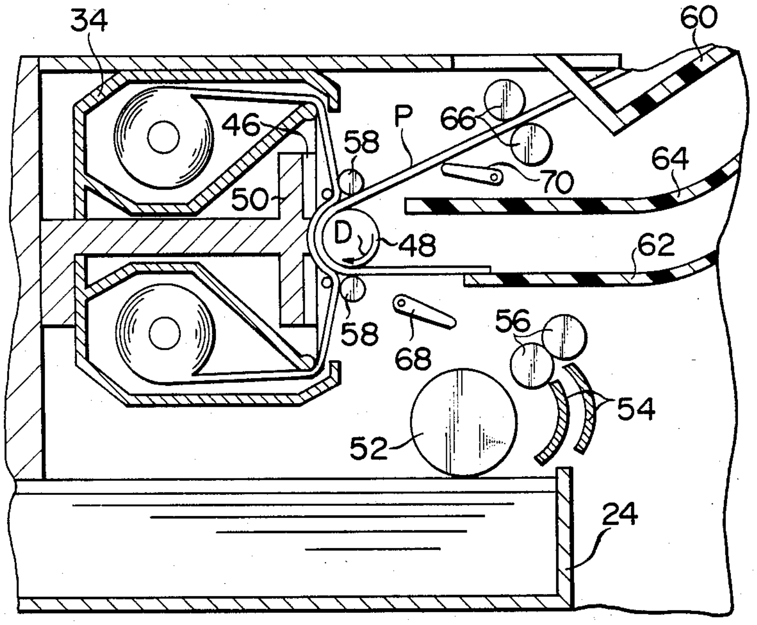

When the sheet P has been transferred to the upper surface of the first guide plate 62, the platen 48 rotates again in the direction of arrow D, as shown in FIG. 9, for the second printing cycle for the second color. After the printing process is thus repeated for the second, third and fourth color, the second distribution guide 70 is held in its upward position so that the sheet P can be discharged onto the bearing plate 60. After the printing (image formation) has been completed, the sheet P is discharged onto the bearing plate 60 of the tray 22.

Figure 10:
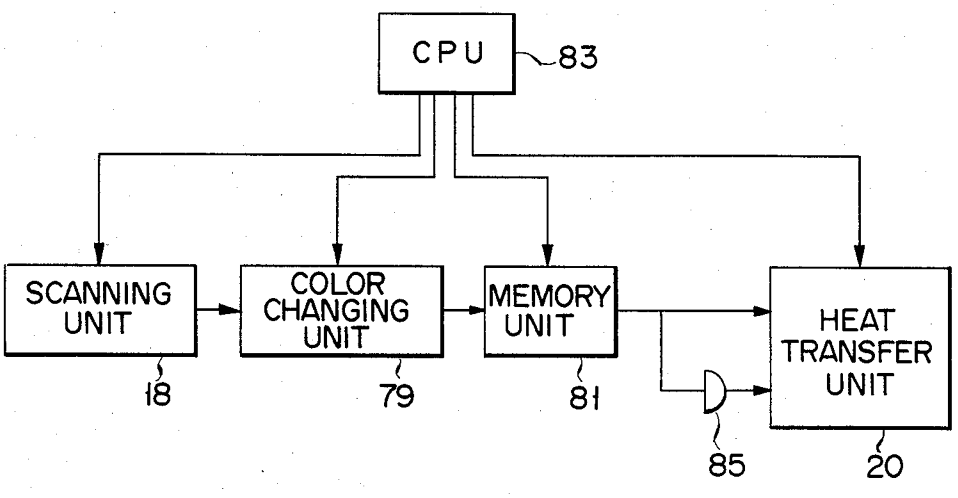
FIG. 10 is a block diagram showing the arrangement of the main part of the thermal transfer printer shown in FIG. 1.

The control system for controlling the thermal transfer printer 10 will be described with reference to FIG. 10. A color changing unit 79 and a memory unit 81 are arranged between the scanning unit 18 and the heat transfer unit (image forming unit) 20. The color changing unit 79 is connected to the scanning unit 18. Color component signals (i.e., green, yellow, cyan and black color signals) detected by the scanning unit 18 are converted so as to correspond to the color agents (inks) (i.e., magenta, yellow, cyan and black) coated on the ribbons. The color changing unit 79 is connected to the memory unit 81. The memory unit 81 stores position data on the document in association with the respective colors. The memory unit 81 is connected to the heat transfer unit 20. The heat transfer unit 20 transfer the respective inks in accordance with the color data and position data which are read out from the memory unit 81, thereby forming an image on the sheet P. An AND gate 85 is inserted between the heat transfer unit (image forming unit) 20 and the memory unit 81 so as to generate a black signal by gating the magenta, yellow and cyan signals.

The scanning unit 18, the color changing unit 79, the memory unit 81 and the heat transfer unit 20 are commonly connected to a CPU (central processing unit) 83 which then controls the signal generation timings of the respective units and the operations thereof.

Referring now to FIGS. 11 to 15, the ribbon cassette 34 will be described in detail. In the case 84 of the ribbon cassette 34 two substantially parallel roll shafts 86 and 88, around which the two end portions of the ribbon 44 are wound, are arranged, as shown in FIG. 10.

The ribbon 44 is enclosed by the case 84 so as to be partially exposed.

Figure 11:
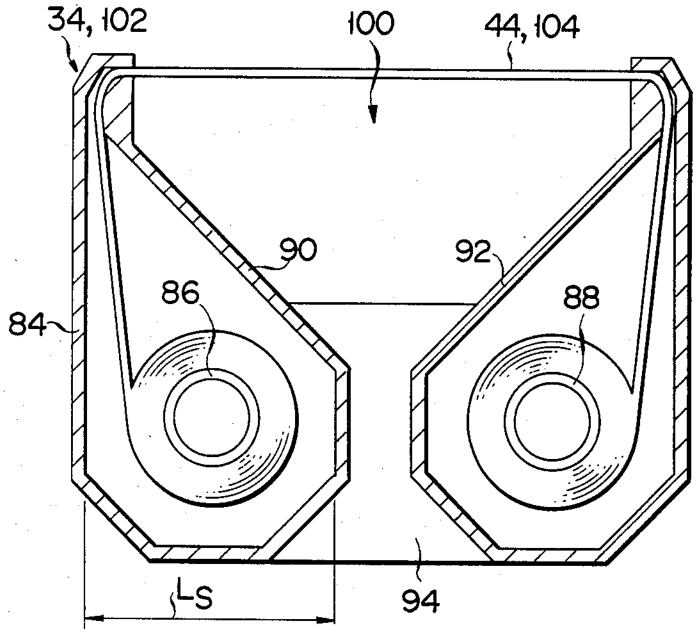
FIG. 11 is a sectional view of a ribbon cassette used in the transfer apparatus of FIG. 1.
Figure 12:
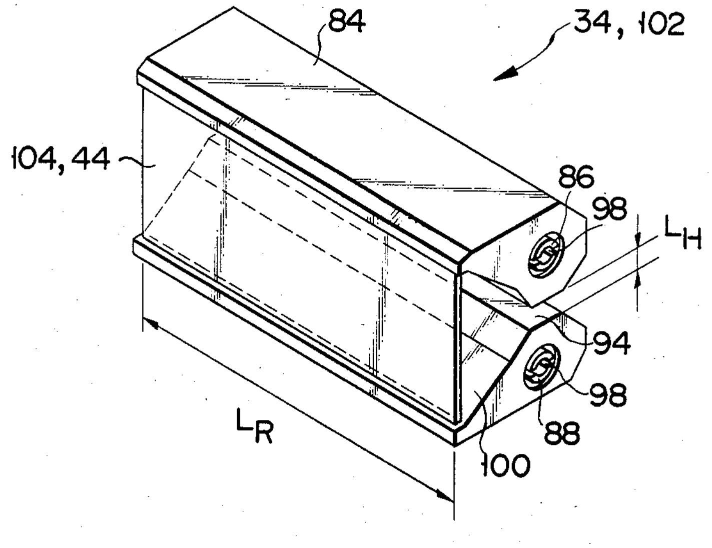
FIG. 12 is a perspective view of the ribbon cassette shown in FIG. 10.
Figure 13:
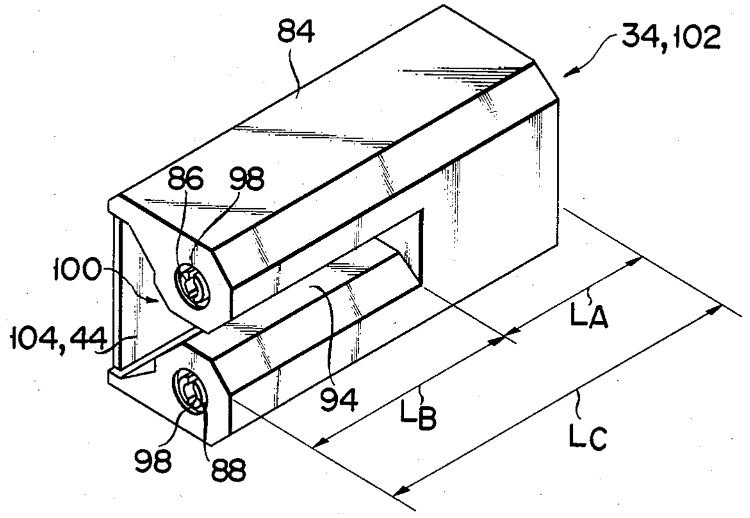
FIG. 13 is another perspective view of the ribbon cassette of FIG. 11 taken from another direction.

As shown in FIGS. 11 to 13, a slit 94 to receive the holder 42 is defined between case portions 90 and 92 which contain the roll shafts 86 and 88, respectively, and the ribbon 44 wound on the roll shafts 86 and 88. As shown in FIG. 13, the slit 94 extends along the extending direction of the roll shafts 86 and 88 and terminates in the middle of the case 84. A pair of notches 98 for the connection with a drive mechanism 96 (mentioned later) are formed in the slit-side end portion of each of the roll shafts 86 and 88.

Figure 14:
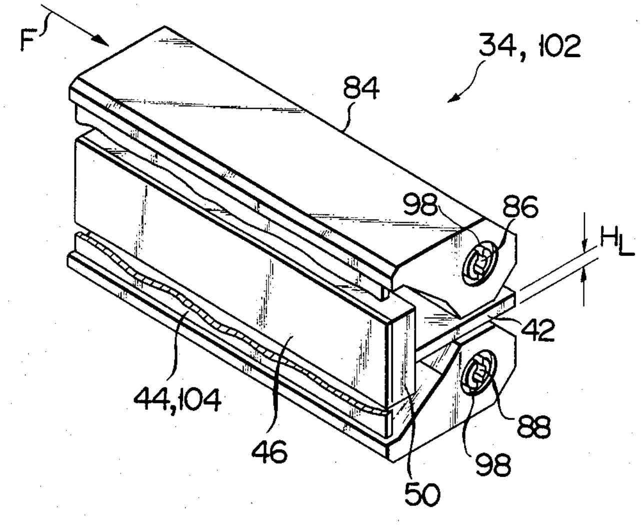
FIGS. 14 and 15 are perspective views for illustrating how the ribbon cassette of FIG. 12 is set in place.
Figure 15:
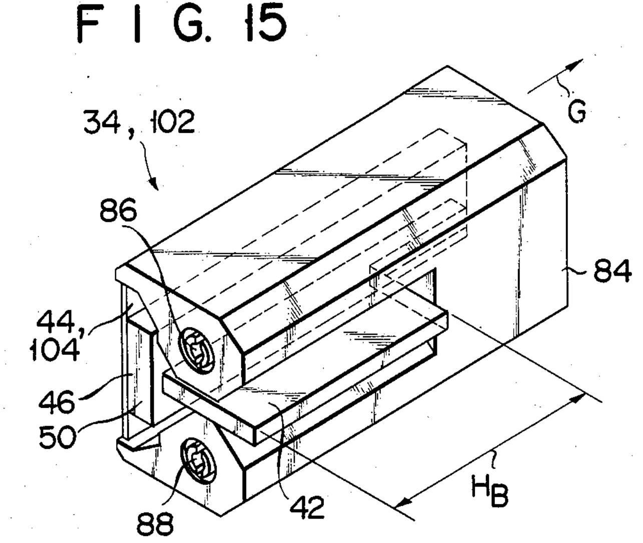

In the ribbon cassette 34, moreover, a space 100 capable of receiving the thermal head 46 is defined between the exposed portion of the ribbon 44 and the case portions 90 and 92. As shown in FIG. 12, the space 100 extends along the extending direction of the roll shafts 86 and 88. With this arrangement, as shown in FIGS. 14 and 15, the ribbon cassette 34 is pushed in the direction of arrow F against the holder 42 and the thermal head 46 when it is inserted into the housing 12. When the ribbon cassette 34 is removed from the housing 12, it is drawn out in the direction of arrow G.

The dimensions of the ribbon cassette 34 are as follows. In FIGS. 11 to 15, the width of the ribbon 44 is indicated by $L_R$ (FIG. 12); the maximum ribbon roll diameter is indicated by $L_S$ (FIG. 11); the slit width is indicated by $L_B$ (FIG. 13); the slit height is indicated by $L_H$ (FIG. 12); the overall ribbon cassette length is indicated by $L_C$ (FIG. 13); the width of slitless portion of ribbon cassette is indicated by $L_A$ (FIG. 13); the holder thickness is indicated by $H_L$ (FIG. 14); and the holder width is indicated by $H_B$ (FIG. 15). Hereupon, there is given a relation $L_B > \frac{1}{2}L_C$. In this embodiment, $L_C$ and $L_B$ are set to be 250 mm and approximately 160 mm, respectively. Thus, the width $L_B$ of the slit 94 to receive the holder 42 is greater than one-half of the overall length $L_C$ of the ribbon cassette 34, so that the holder 42 can securely hold the ribbon cassette 34 over a long range when the ribbon cassette 34 is set in the housing 12.

Since the transverse supporting strength of the thermal head 46 depends on the width $H_B$ (approximately 160 mm in this embodiment) of the holder 42, the slit 94 is formed in a manner such that $L_B$ (approximately 160 mm) is greater than $L_A$ (approximately 90 mm).

The slit height $L_H$ is a little greater than the holder thickness $H_L$ (approximately 10 mm in this embodiment), while the slit width $L_B$ is substantially equal to the holder width $H_B$ (approximately 160 mm). Thus, in loading the housing 12 with the ribbon cassette 34, no play or backlash will occur between the holder 42 and the case 84.

After the thermal head printer 10 prints for a long period of time, foreign material such as dust or ink of the ribbon 44 can attach to the thermal head 46. In this case, the function of the thermal head 46 is degraded, and a clear image cannot be formed on a sheet. For this reason, the thermal head 46 must be cleaned.

Figure 16:
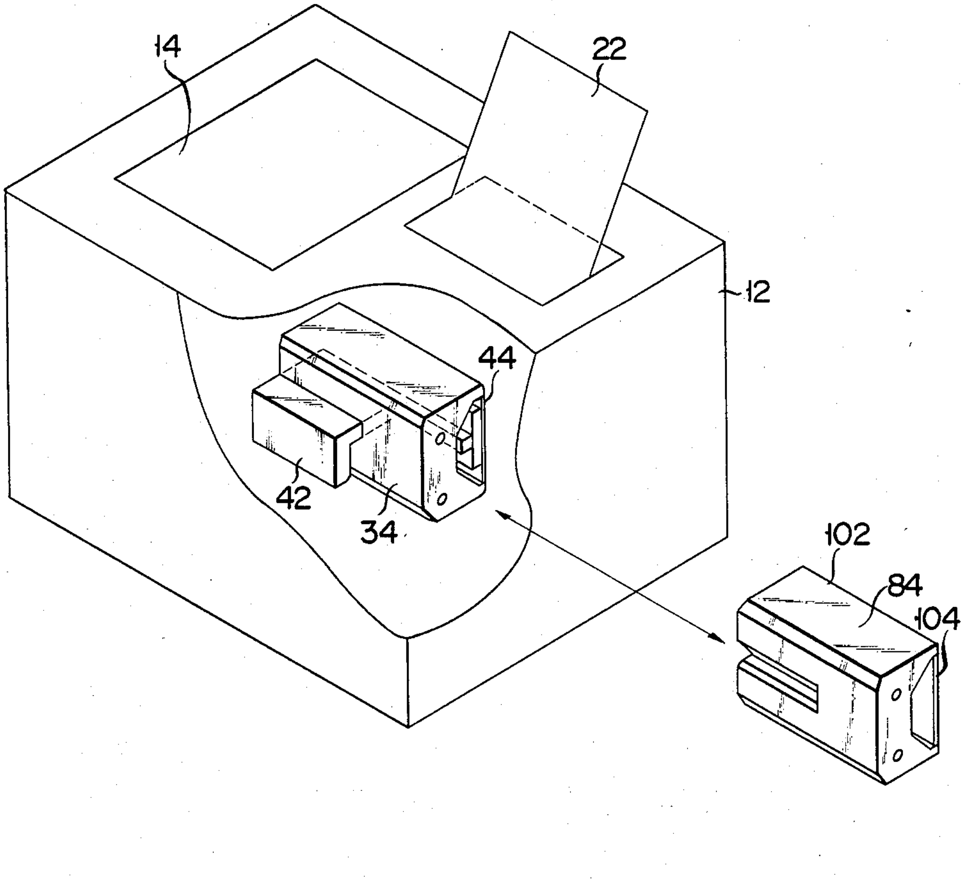
FIG. 16 is a view for explaining an operation for replacing a ribbon cassette loaded in a heat transfer apparatus with a cleaning cassette.

When the thermal head 46 is cleaned, a cleaning cassette 102 is loaded in the printer 10 in place of the ribbon cassette 34, as shown in FIG. 16. The cleaning cassette 102 has substantially the same arrangement as that of the ribbon cassette 34 except for storing a cleaning member 104 instead of the ribbon 44. Therefore, a detailed description of the cleaning cassette 102 is omitted and reference is made to the ribbon cassette 34 shown in FIGS. 11 to 15. The cleaning member 104 stored in the cleaning cassette 102 will be described in detail with reference to FIGS. 16 to 22.

Figure 17:
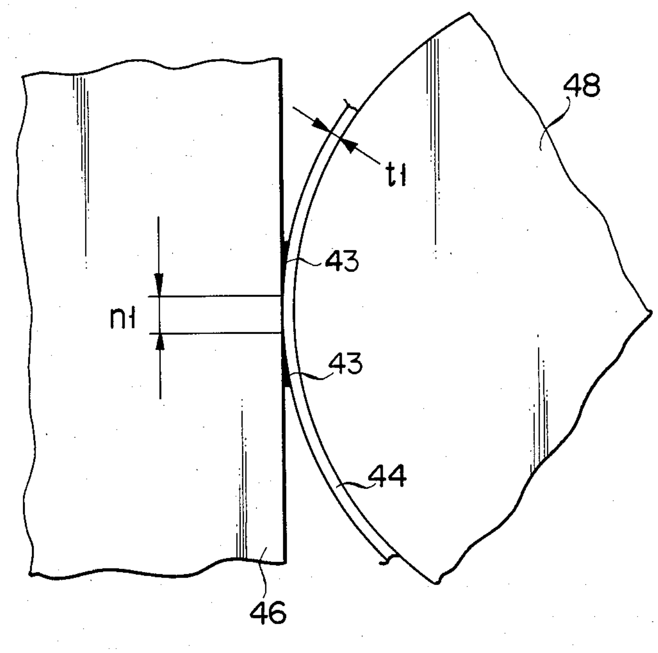
FIG. 17 is an illustration showing a state where foreign material is attached to a thermal head in a thermal transfer mode.
Figure 18:
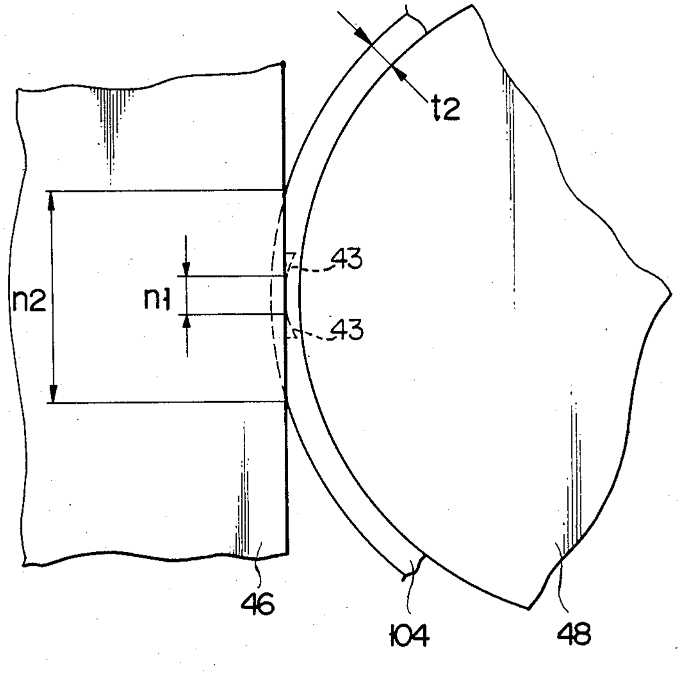
FIG. 18 is an illustration showing a cleaning state of the thermal head.
Figure 19:
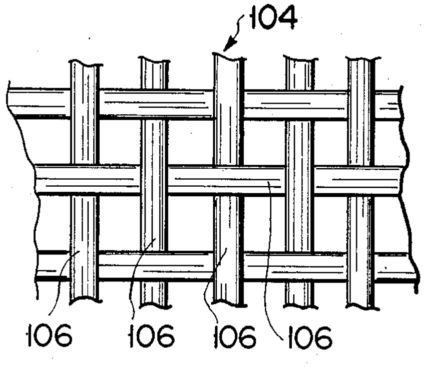
FIG. 19 is a plan view showing a cleaning member stored in the cleaning cassette.
Figure 20:
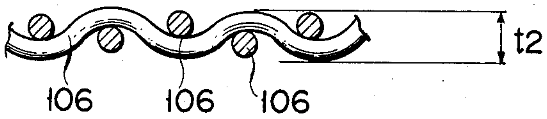
FIG. 20 is a sectional view of the cleaning member shown in FIG. 19.

The cleaning member 104 is formed in the same sheet form as the ribbon 44, and two end portions thereof are wound around the roll shafts 86 and 88, respectively (FIG. 11), in the cleaning cassette 102. As shown in FIGS. 19 and 20, the cleaning member 104 comprises a knitted fiber member 106, e.g., cotton or felt. In this manner, since the cleaning member 104 comprises the knitted fiber member 106, it has a sufficient elasticity. For this reason, the cleaning member 104 can be brought into sufficient contact, that is wide contact, with the thermal head 46. A thickness (t2) of the cleaning member 104 is preferably larger than a thickness (t1, e.g., about 0.1 to 0.5 mm) of the ribbon 44. In other words, the relation t2>t1 is established, and the thickness t2 is about 0.5 mm. In the case of ink transfer operation as shown in FIG. 17, because the ribbon 44 is brought into tight contact with the thermal head 46 to have contact in region n1, foreign material 43 mainly attaches to an area corresponding to a peripheral portion of the contact region n1. Therefore, when the thermal head 46 is cleaned, the cleaning member 104 is preferably brought into tight contact with the thermal head 46 at a contact region n2 which is larger than the region n1 around which foreign material attaches. If the thickness t2 of the cleaning member 104 is sufficiently greater than the thickness t1 of the ribbon 44, the contact region n2 between the head 46 and the cleaning member 104 can be made sufficiently large. Therefore, the thermal head 46 can be effectively cleaned.

In the case of cleaning, after loading the cleaning cassette 102 in a portion used for loading the ribbon cassette 34, the roll shafts in the cleaning cassette 102 are driven, thereby moving the cleaning member 104 and removing the foreign material attached to the thermal head 46. In other words, the cleaning member 104 moves in substantially the same manner as the ribbon in the ribbon cassette 34 moves in the case of thermal transfer.

In the above embodiment, the cleaning cassette 102 is provided separately from the ribbon cassette 34. However, the present invention is not limited to this arrangement. For example, the ribbon 44 stored in the case 84 of the ribbon cassette 34 can be removed therefrom together with the roll shafts 86 and 88, and the cleaning member 104 with the roll shafts 86 and 88 can then be stored therein. In this case, the case 84 of the cassette 34 is formed as to be openable.

As described above, according to the present invention, the cleaning device of the image-forming apparatus comprises a cassette, and the recording head can be easily and quickly cleaned.

The present invention is not limited to the above embodiment, and various changes and modifications may be made within the spirit and scope of the present invention.

For example, in the above embodiment, only the fiber material is used as the cleaning member. However, the fiber material can also be dipped into a liquid, e.g., a thinner for cleaning the thermal head (recording head). The cleaning member is not limited to a fiber material, but can be synthetic resin. In this case, foreign material attached to the thermal head can be electrostatically attracted by the cleaning member.

Figure 21:
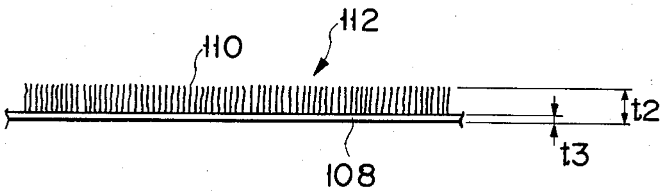
FIG. 21 is a sectional view showing a cleaning member according to another embodiment of the present invention.

As shown in FIG. 21, the cleaning member can be a cleaning member 112 consisting of a base 108 having a thickness of t3 and a carpet-like fiber material 110 arranged thereon. In this case, since a thickness of the cleaning member can be increased (t2+t3) and it has sufficient elasticity, the thermal head can be more effectively cleaned.

Figure 22:
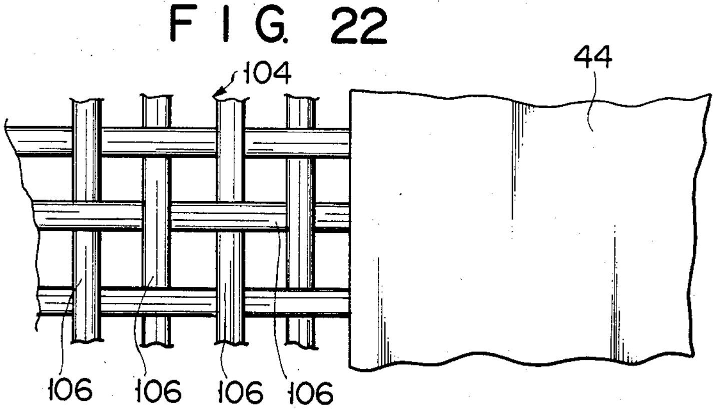
FIG. 22 is a plan view showing a cleaning member according to still another embodiment of the present invention.

Alternatively, as shown in FIG. 22, the cleaning member can be coupled to a rear end portion of the ribbon 44 stored in the cassette case. In this case, since the ink ribbon 44 and the cleaning member are stored in a single ribbon cassette, the thermal head can be cleaned without using a separate cassette for cleaning use, i.e., while loading the ribbon cassette. Note that the position of the cleaning member is not limited to the rear end portion of the ribbon 44. For example, the cleaning member can be formed in a portion of the ribbon 44 at a predetermined distance from a distal end thereof, thus cleaning the thermal head at an appropriate time.

What is claimed is:

1. A thermal transfer type line printer apparatus in which a recording head transfers a color agent from a transfer member in accordance with a latent image so as to form an image on a sheet, said apparatus including a cleaning device for cleaning the recording head, said cleaning device having:

a cassette case which is detachable at a position opposing the recording head; and a cleaning member which is provided in said cassette case and, at a time of cleaning said recording head, is opposed thereto so as to clean contamination of said recording head;

said cleaning member having a thickness greater than that of said transfer member and being formed of a material having elasticity, said cassette case including means for elastically conforming said cleaning member to said recording head and thereby forming a contact region, said contact region having an area greater than an area of contact between said transfer member and said recording head.

2. An apparatus according to claim 1, wherein said cassette case has two roll shafts therein, said cleaning member is formed in a sheet form and two end portions of said cleaning member are wound around said roll shafts, respectively.

3. An apparatus according to claim 2, wherein said roll shafts and said cleaning member stored in said cassette case are provided detachably from said cassette case, and are replaced by the transfer member and other roll shafts around which said transfer member is wound in case of a transfer operation.

4. An apparatus according to claim 1, wherein said cleaning member has a thickness greater than that of said transfer member and is formed of a material having elasticity, and said cleaning member is brought into elastic contact with said recording head so as to have a wider contact area than a contact area of said transfer member.

5. An apparatus according to claim 4, wherein said cleaning member comprises a fiber material formed in a sheet form.

6. An apparatus according to claim 5, wherein said cleaning member comprises said fiber material which is knitted in a matrix form.

7. An apparatus according to claim 5, wherein said fiber material is formed of a felt material.

8. An apparatus according to claim 5, wherein said fiber material comprises a base material formed in a sheet form and a pile material arranged on said base material.

9. An apparatus according to claim 2, wherein said transfer member is stored in said cassette case, said cleaning member is provided at a portion of said transfer member, and after forming an image by transferring a color agent from said transfer member to the sheet, said cleaning member is subsequently brought into contact with said recording head to clean said recording head while said transfer member is still in position.

10. An apparatus according to claim 9, wherein said cleaning member is provided at a rear end portion of said transfer member stored in said cassette case.

11. A thermal transfer type line printer apparatus in which a recording head transfers a color agent from a transfer member in accordance with a latent image so as to form an image on a sheet, said apparatus including a cleaning device for cleaning the recording head, said cleaning device comprising:

a cleaning member in the form of a sheet and having two end portions;

a pair of roll shafts individually engaging the two end portions of the cleaning member and wound with the cleaning member, whereby the cleaning member is fed in one direction; and a case integrally enclosing the pair of roll shafts and the cleaning member and opening on one side thereof so that part of the cleaning member located between the two roll shafts is exposed, said case also having a slit in a surface other than said one side, said slit cooperating with a holder in said cleaning device so that the cleaning member is guided through the slit onto the holder to be held thereby when the cleaning device is set in the image-forming apparatus.

12. An apparatus for cleaning an image-forming device, said device having a recording head with a flat surface for transfer of a color agent from a transfer member to a sheet, said transfer member being engaged by and conforming to a rotating cylindrical surface of a platen and being continuously pressed by said platen against said flat surface, contamination of said recording head occurring adjacent the area of contact between said flat surface and said transfer member, said apparatus comprising:

a cassette case having a cleaning ribbon;

means for inserting said cassette case in said image-forming device such that said cleaning ribbon is positioned between said cylindrical surface of said platen and said flat surface of said recording head, said cleaning ribbon having a thickness greater than a thickness of said transfer member;

means for conforming said cleaning ribbon with said rotating cylindrical surface of said platen to continuously press said ribbon against said recording head, thereby forming a contact region greater than said area of contact between said recording head and said transfer member, said contact region encompassing said contamination; and means for removing said contamination contacted by said cleaning ribbon.

* * * * *